(12) United States Patent
Steiner

(10) Patent No.: US 9,207,256 B2
(45) Date of Patent: Dec. 8, 2015

(54) AUTO-CALIBRATION OF ACCELERATION SENSORS

(75) Inventor: Christoph Steiner, St. Margarethen (AT)

(73) Assignee: INFINEON TECHNOLOGIES AG, Neubiberg (DE)

(*) Notice: Subject to any disclaimer, the term of this patent is extended or adjusted under 35 U.S.C. 154(b) by 840 days.

(21) Appl. No.: 13/372,970

(22) Filed: Feb. 14, 2012

(65) Prior Publication Data

US 2013/0211764 A1  Aug. 15, 2013

(51) Int. Cl.
*G01C 25/00* (2006.01)
*G01P 21/00* (2006.01)
*G01P 15/12* (2006.01)

(52) U.S. Cl.
CPC ............... *G01P 21/00* (2013.01); *G01P 15/123* (2013.01)

(58) Field of Classification Search
CPC ............................. G01C 25/005; G01P 21/00
See application file for complete search history.

(56) References Cited

U.S. PATENT DOCUMENTS

| 5,095,762 | A | * | 3/1992 | Holm-Kennedy et al. ............... 73/862.041 |
| 6,055,841 | A | | 5/2000 | Yamada et al. |
| 6,834,528 | B2 | * | 12/2004 | Kappi et al. ................ 73/1.75 |
| 2005/0072223 | A1 | | 4/2005 | Fennel et al. |
| 2010/0116020 | A1 | | 5/2010 | Titolo |
| 2011/0277532 | A1 | * | 11/2011 | Bartholomeyczik et al. .. 73/1.38 |

FOREIGN PATENT DOCUMENTS

| DE | 3400259 A1 | 7/1984 |
| DE | 3717677 C1 | 12/1988 |
| DE | 102009028072 A1 | 2/2011 |
| FR | 2879750 A1 | 6/2006 |

* cited by examiner

*Primary Examiner* — Elias Desta
(74) *Attorney, Agent, or Firm* — SpryIP, LLC

(57) ABSTRACT

Representative implementations of devices and techniques provide calibration for a sensor. The calibration includes adapting an output signal of the sensor based on acceleration components at the sensor and a rotational frequency of the sensor.

24 Claims, 4 Drawing Sheets

AUTO-CALIBRATION OF ACCELERATION SENSORS

BACKGROUND

In complex mechanical systems, e.g. modern vehicles, industrial machinery, conveyer systems, and the like, sensors, such as acceleration sensors, may be used to detect properties of rotating components of the system and/or forces acting on the rotating components. Sensors may be employed to provide a signal to a controller or processor, for example, for control of the operation of the system, based on the properties and/or the forces. For instance an acceleration sensor coupled to a wheel may be used to signal a vehicle processor regarding acceleration values used in an anti-lock braking system, a tire pressure monitoring system, or the like.

Sensors are commonly calibrated at the production facility during production of the sensor. However, the various environments where sensors are employed may adversely affect the accuracy of the output of the sensors when they are operating in the field. Accuracy and reliability of such sensors may not be acceptable, especially for applications having narrow tolerances.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the arrangements illustrated in the figures are shown as having a multiplicity of components. Various implementations, as described herein, may include fewer components and remain within the scope of the disclosure. Alternately, other implementations may include additional components, or various combinations of the described components, and remain within the scope of the disclosure.

DETAILED DESCRIPTION

Overview

Representative implementations of techniques and/or devices provide calibration for a sensor. In various implementations, the calibration is performed in real-time, and utilizes an acceleration component due to gravitational force acting at the sensor. An output signal of the sensor may be adapted (i.e., corrected, calibrated, etc.) based on a rotational frequency of the sensor. In an implementation the output signal of the sensor is adapted based on one or more environmental parameters (e.g., temperature, pressure, etc.) as well. The calibration, or adaptation of the output signal of the sensor may be performed dynamically (i.e., in real time) during normal operation of the sensor.

Figure 1:
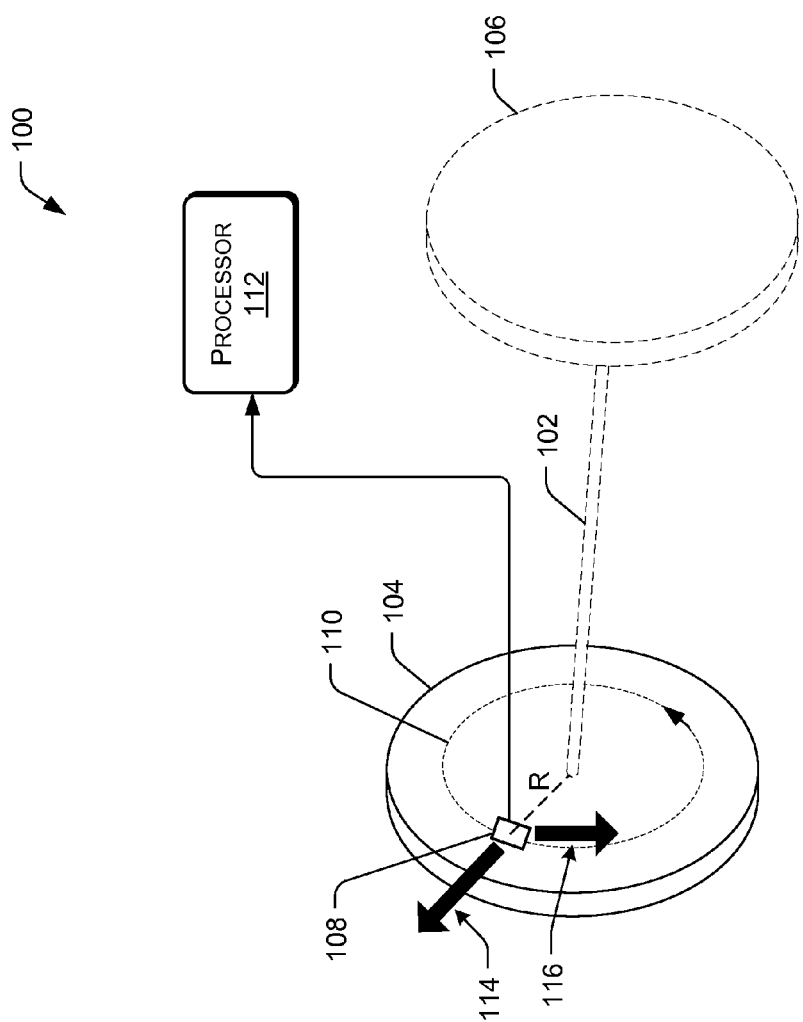
FIG. 1 is a schematic drawing of an example calibration system according to an implementation.

Various implementations of calibration for a sensor with respect to an example calibration system illustrated in FIG. 1 are discussed. The representative calibration system illustrates one example of techniques and devices as may be applied to a vehicle, for instance. Techniques and devices of sensor calibration are then discussed with reference to example calibration systems and implementations, along with related waveforms illustrated in FIGS. 2 and 3. The techniques and devices discussed may be applied to any of various systems, circuits, and devices and remain within the scope of the disclosure. For example, the techniques and devices are not limited to vehicle applications, and are applicable to other systems having a rotating component as well. The illustrated waveform shows an acceleration curve for a rotating sensor, and demonstrates how a rotational frequency may be determined based on timing characteristics of the waveform and associated acceleration signals. Finally, this disclosure discusses an example process of calibrating a sensor with reference to a flow diagram shown in FIG. 4.

Implementations are explained in more detail below using a plurality of examples. Although various implementations and examples are discussed here and below, further implementations and examples may be possible by combining the features and elements of individual implementations and examples.

Example Calibration System

FIG. 1 is a schematic drawing showing an illustrative calibration system 100, wherein an implementation of automatic sensor calibration may be employed. It is to be understood that components of an example system 100 may be collocated (coupled to a common vehicle, for example) or one or more components may be located remotely from other components (control, processing, memory storage, and the like, may be remotely located, for example).

The illustrated calibration system 100 in FIG. 1 is shown and described in terms of a vehicle, with a portion of the vehicle showing, including an axle 102 and two wheels 104 and 106 coupled to the axle 102. This illustration is, however, for ease of discussion. The techniques and devices described herein with respect to sensor calibration is not limited to the specific arrangement illustrated in FIG. 1 nor to a vehicle, and may be applied to other types of machines, devices, systems, or the like without departing from the scope of the disclosure. For example, the techniques and devices described herein may be applied to a rotating object or to any system with a rotating component (referred to generally herein as a "wheel") such as a flywheel, a gear, a shaft, a propeller, a blade, and the like.

As shown in FIG. 1, a sensor 108 is coupled to a wheel 104. In alternate embodiments, multiple wheels (104, 106) may include a sensor 108 coupled to the wheel(s). When the wheel 104 rotates, the sensor 108 is arranged to rotate also. In alternate implementations, the sensor 108 is arranged to rotate at the same rotational frequency or at a different rotational frequency of the wheel 104. The circular path described by the rotation of the sensor 108 is shown as path 110 (shown with a dashed line). Path 110 is a distance R (also shown with a dashed line) from the center of the wheel 104 and the axle 102. Twice the distance R is equal to the diameter of the circular path 110. In one implementation, the distance R is constant during operation of the system 100. In alternate implementations, the distance R may be varied, adjusted, incremented, and the like.

In various implementations, the sensor 108 is an acceleration sensor, arranged to detect acceleration in one or more directions or axes. In one example, the sensor 108 is comprised of a wheatstone bridge including a piezo-resistive device. In one implementation, the sensor 108 has at least one sensitivity axis in a radial direction co-planar to the wheel 104 (i.e., rotating object) and orthogonal to the axle 102. For example, the sensor 108 is arranged to detect acceleration in a radial direction (i.e., in a direction originating at the center of the wheel 104 and extending towards the outer periphery of the wheel 104. In another implementation, the sensor 108 is also arranged to detect acceleration in other directions also, for example, a direction corresponding to the gravitational pull of the earth. In various alternate implementations, multiple sensors 108 may be coupled to a wheel 104, with each arranged to detect acceleration in one or more directions.

As shown in FIG. 1, an example calibration system 100 also includes one or more processor(s) 112. As used herein, the term "processor 112" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components.

In one implementation, the processor 112 is arranged to receive an output signal from the sensor 108. In an implementation, the processor 112 is arranged to calibrate the sensor 108 based on the output signal received from the sensor 108. For example, the processor 112 may calibrate the sensor 108 by modeling a relationship between the output signal of the sensor 108 and the rotational frequency of the sensor 108. For example, the processor 112 may calculate one or more coefficients for a mathematical model that describes the behavior of the sensor 108. Additionally or alternatively, the processor 112 may adapt the output signal to adjust (e.g., correct, align, etc.) the signal for the environmental and/or operating conditions of the sensor 108, based on the calibration. As a result of the calibration, the output of the processor 112 may include a corrected or "true" radial acceleration at the sensor 108.

When the sensor 108 rotates, at least two acceleration components (i.e., forces) act on the sensor 108. As shown in FIG. 1, one of the acceleration components is a radial acceleration component 114 (shown with a heavy dark arrow) due to centrifugal force acting on the sensor 108. Another acceleration component is a gravitational acceleration component 116 (also shown with a heavy dark arrow) due to the gravitational pull of the earth on the sensor 108. In an implementation, the sensor 108 is arranged to detect one or both of the acceleration components (114 and 116). In a further implementation, the output signal of the sensor 108 is based on one or both of the acceleration components (114 and 116). Additionally or alternatively, the output signal is based on other acceleration components and/or other signal components. In one implementation, the processor 112 is arranged to calculate the acceleration component 114 due to centrifugal force acting on the sensor 108. In a further implementation, as is discussed in a later section, the processor 112 is arranged to calibrate the sensor 108 based on the output signal and the calculated acceleration component 114 due to centrifugal force acting on the sensor 108. In another implementation, the processor 112 is also arranged to calibrate the sensor 108 based on the output signal and the acceleration component 116 due to the gravitational force.

Figure 2:
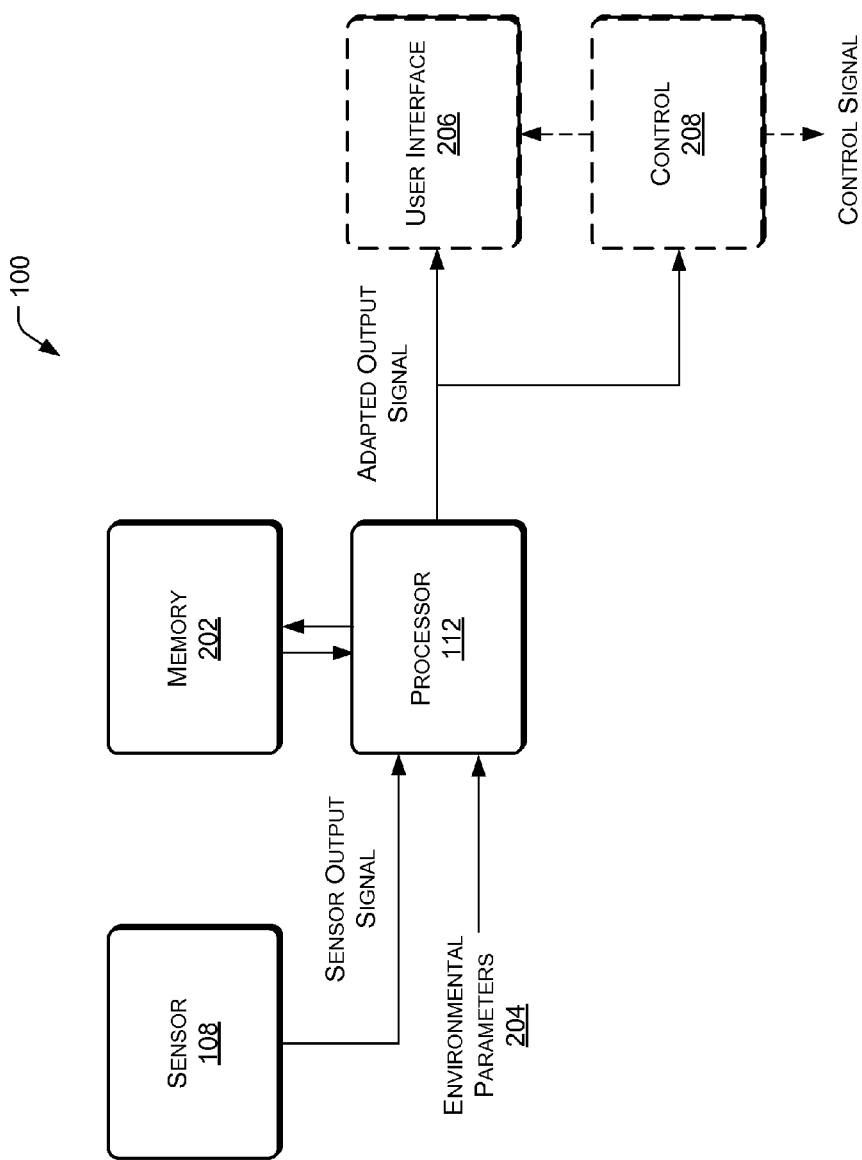
FIG. 2 is a block diagram of an example calibration system shown with optional components, according to an implementation.

FIG. 2 is a block diagram of an example calibration system 100 showing signal path connectivity. As previously discussed, the sensor 108 outputs a signal based on one or more acceleration components acting at the sensor 108 and detected by the sensor 108. The processor 112 receives the output signal of the sensor 108 and outputs an adapted output signal that is a calibrated version of the output signal of the sensor 108. In an implementation, the processor 112 performs the calibration of the sensor 108 (i.e., outputs the adapted output signal based on the output signal of the sensor 108) during normal operation of the sensor 108 and while the wheel 104 is rotating.

In one implementation, the system 100 includes a memory storage device ("memory") 202 coupled to the processor 112. If included, the memory 202 (i.e., computer-accessible storage device) may store executable instructions, software, firmware, operating systems, applications, preselected values and constants, and the like, to be executed or used by the processor 112, for example. In various implementations, the memory 202 may include computer-readable media. Computer-readable media may include, for example, computer storage media. Computer storage media, such as memory 202, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the processor 112). It will be appreciated that the memory 202 may be local, distributed, or located remotely, and may be accessed via a network or other communication link (e.g., wired, wireless, optical, etc.).

In one implementation, the memory 202 is coupled to the processor 112 and is arranged to store one or more sets of data. For example, a set of data may include: the output signal from the sensor, the acceleration component 114 due to the centrifugal force, the rotational frequency of the sensor, and the like. In one example, a set of data also includes the acceleration component 116 due to gravitational force on the sensor 108.

In various implementations, the processor 112 is arranged to calibrate the sensor 108 based on one set of data or based on multiple sets of data stored at the memory 202. Multiple sets of data may include different rotational frequencies of the sensor 108. For example, a single set of data may correspond to an associated rotational frequency of the sensor 108, and multiple sets of data may be associated with various rotational frequencies. In one implementation, the processor 112 is arranged to calibrate the sensor 108 based on a preset number of sets of data having different associated rotational frequencies.

In another implementation, the processor 112 is arranged to receive one or more environmental parameters 204 of the sensor 108 and to calibrate the sensor 108 based on the one or more environmental parameters 204. For example, additional sensors (not shown), or the like, may be included in the system 100 that are arranged to detect environmental parameters 204 such as a temperature of the sensor 108, the atmospheric pressure at the sensor 108, the relative humidity at the sensor 108, and the like. Various environmental parameters 204, or combinations thereof, may cause inaccuracies or biasing of the output signal of the sensor 108. The processor 112 may adjust the output signal of the sensor 108 based on the values of the environmental parameters 204 to compensate for any such effects.

In one implementation, the adapted output signal may be output by the processor 112 and received by a user interface 206. For example, the user interface 206 may comprise a display, one or more indicators, or the like. The user interface 206 may indicate the adapted output signal to a user in various forms for the user's information. In one example, the user interface 206 indicates the value of the true (i.e., calibrated, adjusted, corrected, etc.) radial acceleration (i.e., acceleration component 114 due to centrifugal force) of the sensor 108. In another example, the user interface 206 indicates another condition and/or other information to the user based on the true radial acceleration of the sensor 108 (e.g., a performance measurement, a safety measurement, etc.).

In an alternate implementation, the adapted output signal may be received by a control module 208. For example, the control module 208 may be arranged to take some action based on the value of the adapted output signal. In one example, the control module 208 may be arranged to send a signal to the user interface 206 (if included) based on the value of the adapted output signal. In various other examples, the control module 208 may be arranged to send control signals to other systems of the vehicle, device, etc. to change various operating parameters. For instance, the control module 208 may cause a fraction control mechanism to engage, may cause power being fed to a particular drive axle to be increased or decreased, and the like, based on the value of the adapted output signal.

In alternate implementations, a calibration system 100 may include fewer components, alternate components, or additional components and remain within the scope of the disclosure.

Example Sensor Calibration

In an implementation, the output signal of the sensor 108 may comprise a function of one or more environmental parameters 204 and the "true" acceleration. The relationship may be mathematically modeled to compensate the "raw" output signal of the sensor 108 for the environmental parameter(s) 204, and to obtain a resulting true acceleration acting at the sensor 108. The output signal of the sensor 108 ($A_{sensor}$) can be expressed as:

$$A_{sensor} = C0 + C1 * A_{radial} \qquad (1)$$

where $A_{radial}$ represents the true radial acceleration applied to the sensor 108 and C0 and C1 represent coefficients of the mathematical model. As shown in equation (1), the coefficients C0 and C1 may modify or adjust the output signal $A_{sensor}$ of the sensor 108 to result in a true (i.e., corrected, etc.) acceleration at the sensor 108. Further, $A_{radial}$ may be expressed as:

$$A_{radial} = 4\pi^2 f^2 R, \qquad (2)$$

where f is the frequency of rotation of the sensor 108 and R is the radius of the rotational path 110. Accordingly, in an implementation, the processor 112 is arranged to calculate a true radial acceleration $A_{radial}$ at the sensor 108 based on the acceleration component 116 at the sensor 108 due to gravitational force and a distance R from the center of the wheel 104 to the sensor 108. The frequency of rotation of the sensor 108 may be estimated (e.g., by the processor 112, for example) based on the acceleration component 116 at the sensor 108 due to the gravitational force.

In one implementation, calibration comprises calculating and updating the coefficients C0 and C1 during operation of the sensor 108. For example, the processor 112 may be arranged to calculate coefficients C0 and C1 during normal operation of the sensor 108, while the sensor 108 is rotating.

In another implementation, calibration comprises calculating and updating only one coefficient (the coefficient C0, for example) during operation of the sensor 108, while the other coefficient (e.g., C1) may be assumed to be known and fixed. In this implementation, the distance R from the center of the wheel 104 to the sensor 108 may be unknown.

In one example, two or more calibration trials are performed at different rotational frequencies, obtaining two or more instances of equation (1). This results in at least two values for $A_{sensor}$ and at least two values for $A_{radial}$. The system of two equations with two unknowns may be solved for coefficients C0 and C1. In one implementation, the coefficients C0 and C1 are stored in the memory 202 with associated environmental parameter(s) 204 for the given calibration trials. In an alternate implementation, dependency on the environmental parameter(s) 204 may be neglected in the mathematical model.

Figure 3:
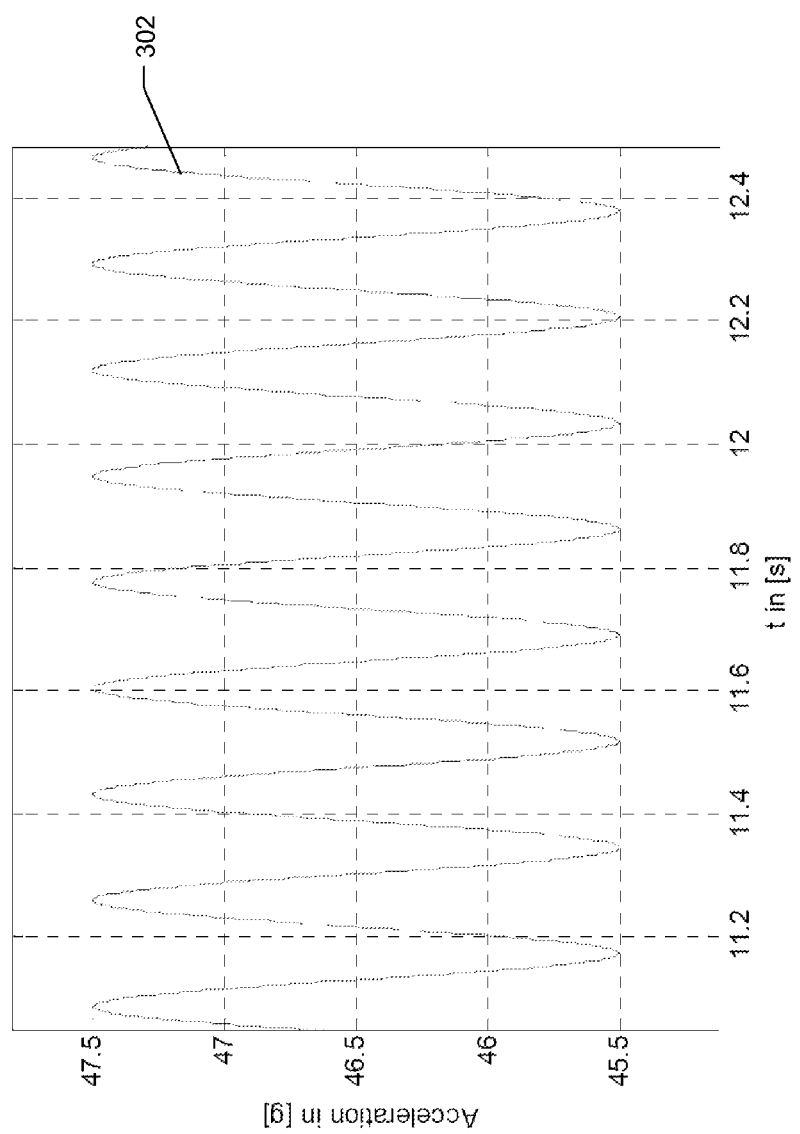
FIG. 3 is an illustrative signal timing diagram according to an implementation.

In an implementation, the processor 112 calculates the rotational frequency f of the sensor 108 based on the acceleration component 116 due to the force of gravity acting on the sensor 108. FIG. 3 is an illustrative signal timing diagram showing the acceleration component 116 due to the force of gravity biased by the acceleration component 114 due to centrifugal force (radial acceleration), according to an implementation. Plotting the combination of the two acceleration components (114 and 116) as the sensor 108 rotates results in the waveform 302 and the graph of FIG. 3. The resulting waveform 302 shows a constant frequency of oscillation of the acceleration component 116 due to the force of gravity, and thus a constant rotational frequency of the sensor 108.

When the sensor 108 is rotating at a constant speed (i.e., rotational frequency is constant), the magnitude of the radial acceleration component 112 is substantially constant. When the rotational frequency of the sensor 108 increases or decreases, the magnitude of the radial acceleration component 112 increases or decreases respectively. However, the magnitude of the acceleration component 116 due to gravity remains constant at 1 g=9.81 m/s².

In various implementations, the frequency of oscillation of waveform 302 (and thus the rotational frequency of the sensor 108) may be estimated using sinusoidal parameter estimation, a discrete Fourier transform, or the like.

Representative Process

Figure 4:
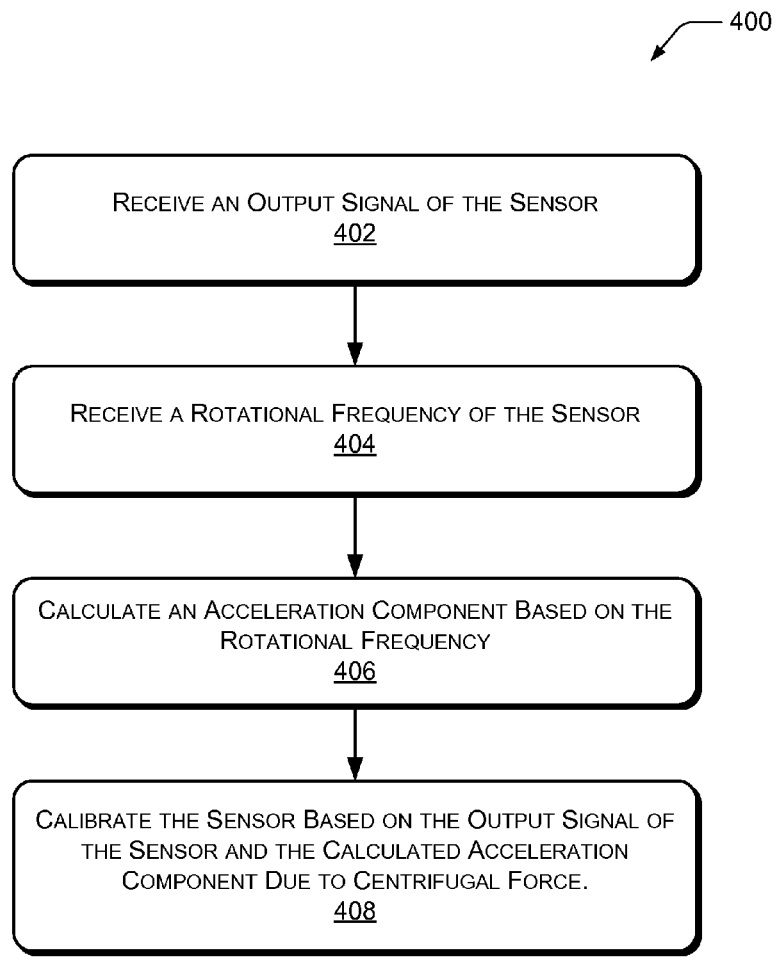
FIG. 4 a flow diagram illustrating an example process for calibrating a sensor according to an implementation.

FIG. 4 illustrates a representative process 400 for calibrating a sensor (such as sensor 108, for example). In an implementation, the sensor is coupled to a wheel or other rotating object, such as wheel 104. In one instance, the sensor is an acceleration sensor.

An example process 400 includes calibrating an output signal of the sensor based on components of the output signal and a rotational frequency of the sensor as it rotates about a central axis. In various implementations, the rotational frequency is based on an acceleration component due to the force of gravity on the sensor (such as acceleration component 116). The process 400 is described with reference to FIGS. 1-3.

The order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

At block 402, the method includes receiving an output signal of the sensor. For example, the output signal of the sensor may be received at a processor such as processor 112. In an implementation, the output signal comprises one or more acceleration components acting at the sensor. For example, the output signal may comprise an acceleration component due to centrifugal force acting at the sensor (such as acceleration component 114, for example).

At block 404, the method includes receiving a rotational frequency of the sensor. For example, the rotational frequency of the sensor may also be received at the processor. In alternate implementations, the processor may calculate the rotational frequency of the sensor based on an acceleration component due to the force of gravity acting on the sensor. For example, the acceleration component due to the force of gravity may be included in the output signal from the sensor received at the processor. In various implementations, the processor may compute the rotational frequency of the sensor from the output signal of the sensor via sinusoidal parameter estimation, a discrete Fourier transform, or the like.

At block 406, the method includes calculating an acceleration component due to centrifugal force acting at the sensor, based on the rotational frequency of the sensor. Accordingly, there may be a relationship between the acceleration component due to centrifugal force, the rotational frequency of the sensor, and a diameter of the path of rotation of the sensor. For example, in an implementation, given the rotational frequency of the sensor and the diameter of the rotational path of the sensor, the processor calculates the acceleration component due to centrifugal force acting at the sensor.

In one implementation, the method includes receiving one or more environmental parameters (such as environmental parameters 204) of the sensor. Environmental parameters may include temperature, pressure, relative humidity, and the like. The output signal of the sensor may be adversely affected by one or more of the environmental parameters, causing the output signal to be more or less inaccurate.

At block 408, the method includes calibrating the sensor based on the output signal of the sensor and the calculated acceleration component due to centrifugal force. Accordingly, the output signal of the sensor may be corrected (i.e., compensated, adjusted, etc.) for inaccuracies, including any adverse effects of environmental parameters.

In an implementation, the process includes adapting the output signal of the sensor. Adapting the output signal of the sensor may include modeling a relationship between the output signal and the rotational frequency of the sensor and adapting the output signal of the sensor based on the model. In one implementation, the model is a mathematical model including one or more coefficients representing constants, where the coefficients provide offset, scaling, or the like, or a combination, to the output signal of the sensor. In one implementation, the processor is arranged to calculate one or more coefficients based on the output signal of the sensor and the rotational frequency of the sensor. Accordingly, in an implementation, the adapting includes combining the output signal of the sensor with one or more constant signals. For example, the processor may be arranged to combine one or more coefficients with the output signal of the sensor to determine a true radial acceleration for the sensor (i.e., an actual acceleration component due to centrifugal force.

In another implementation, the method includes computing a radial acceleration of the sensor and adapting the output signal of the sensor based on the computation. For example, the processor may calculate an estimated radial acceleration of the sensor, and use the calculation in determining the coefficients described above.

In one implementation, the process 400 further comprises calibrating the sensor during normal operation of the sensor in substantially real-time. For example, in an implementation, calibrating the sensor includes adapting the output signal of the sensor based on the rotational frequency and one or more environmental parameters during normal operation (e.g., while the sensor is rotating and the wheel is rotating). In one example, the method includes monitoring one or more environmental parameters of the sensor and updating calibration of the sensor based on the monitoring. In another example, the method includes monitoring the one or more environmental parameters of the sensor and updating an adaptation of the output signal of the sensor based on the monitoring. The monitoring may be periodic, constant, real-time, or the like.

In another implementation, the process 400 further comprises storing the one or more environmental parameters for one or a plurality of calibration trials. The environmental parameters may be stored in a memory storage device (such as memory 202, for example). In one implementation, the process includes varying the rotational frequency of the sensor for one or more trials of the plurality of calibration trials. For example, the rotational frequency of the sensor may be increased or decreased in a preset pattern or a random pattern for a set number of calibration trials.

In alternate implementations, other techniques may be included in the process 400 in various combinations, and remain within the scope of the disclosure.

At least portions of the arrangements and procedures of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various methods and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The arrangements and procedures described and illustrated herein may be readily implemented in hardware and/or software using any known or later developed systems or structures, devices and/or software by those of ordinary skill in the applicable art from the functional description provided herein and with a general basic knowledge of the computer arts.

Moreover, the disclosed procedures may be readily implemented in software that can be stored on a computer-readable storage medium (such as memory 202), executed on a programmed general-purpose computer with the cooperation of memory 202, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated arrangement or arrangement component, or the like. The arrangements may also be implemented by physically incorporating the arrangements and/or procedures into a software and/or hardware system, such as the hardware and software systems of a test/modeling device.

Conclusion

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A method of calibrating a sensor, comprising:
   receiving an output signal of the sensor, the output signal comprising one or more acceleration components acting at the sensor;
   receiving a rotational frequency of the sensor;
   calculating an acceleration component due to a centrifugal force acting at the sensor, based on the rotational frequency of the sensor;
   computing a radial acceleration of the sensor and adapting the output signal of the sensor based on the computation; and
   calibrating the sensor based on the output signal of the sensor and the calculated acceleration component due to the centrifugal force.

2. The method of claim 1, further comprising calibrating the sensor during normal operation of the sensor in substantially real-time.

3. The method of claim 1, wherein the output signal comprises an acceleration component due to a gravitational force acting at the sensor, and further comprising determining the rotational frequency of the sensor based on the acceleration component due to the gravitational force acting at the sensor.

4. The method of claim 1, further comprising computing the rotational frequency of the sensor from the output signal of the sensor via at least one of a sinusoidal parameter estimation and a discrete Fourier transform.

5. The method of claim 1, further comprising modeling a relationship between the output signal and the rotational frequency of the sensor.

6. The method of claim 1, wherein the adapting includes combining the output signal of the sensor with one or more constant signals.

7. The method of claim 1, further comprising monitoring one or more environmental parameters of the sensor and updating a calibration of the sensor based on the monitoring.

8. The method of claim 7, wherein the one or more environmental parameters include at least one of a temperature and a pressure.

9. The method of claim 7, further comprising storing the one or more environmental parameters for a plurality of calibration trials.

10. The method of claim 9, further comprising varying the rotational frequency of the sensor for one or more trials of the plurality of calibration trials.

11. A system, comprising:
    a sensor coupled to a rotating object, the sensor having at least one sensitivity axis in a radial direction co-planar to the rotating object, the sensor arranged to detect an acceleration at the sensor; and
    a processor coupled to the sensor, the processor arranged to receive an output signal from the sensor, to calculate an acceleration component due to a centrifugal force acting at the sensor, the calculation based on a rotational frequency of the sensor, and to calibrate the sensor based on the output signal and the calculated acceleration due to the centrifugal force, the processor further arranged to estimate a radial acceleration at the sensor based on the rotational frequency of the sensor and a distance from a center of the rotating object to the sensor.

12. The system of claim 11, further comprising a memory storage device coupled to the processor and arranged to store a set of data including at least one of the output signal from the sensor, the calculated acceleration due to the centrifugal force, and the rotational frequency of the sensor.

13. The system of claim 12, wherein the processor is arranged to calibrate the sensor based on multiple sets of data stored at the memory storage device.

14. The system of claim 13, wherein the multiple sets of data include different rotational frequencies of the sensor.

15. The system of claim 11, wherein the processor is arranged to receive one or more environmental parameters of the sensor and to calibrate the sensor based on the one or more environmental parameters.

16. The system of claim 11, wherein the processor is arranged to calibrate the sensor during operation of the sensor and while the object is rotating.

17. The system of claim 11, wherein the sensor is arranged to detect an acceleration at the sensor due to a gravitational force, and the processor is arranged to calibrate the sensor based on the acceleration due to the gravitational force.

18. The system of claim 17, wherein the processor is arranged to calculate the rotational frequency of the sensor based on the acceleration at the sensor due to the gravitational force.

19. The system of claim 11, wherein the sensor comprises a wheatstone bridge including a piezo-resistive device.

20. The system of claim 11, wherein the distance from the center of the rotating object to the sensor is constant.

21. At least one computer-accessible storage device comprising computer-executable instructions that, when executed by a processor, direct the processor to perform operations including:
    receive an output signal of a sensor coupled to a rotating object, the output signal comprising a first acceleration component due to a centrifugal force acting at the sensor and a second acceleration component due to a gravitational force acting at the sensor;
    determine a rotational frequency of the sensor based on the second acceleration component due to the gravitational force acting at the sensor;
    model a relationship of the output signal of the sensor and the rotational frequency of the sensor; and
    adapt the output signal of the sensor based on the model of the relationship.

22. The at least one computer-accessible storage device of claim 21, wherein the processor is further directed to calculate one or more coefficients based on the output signal of the sensor and the rotational frequency of the sensor, and to combine the one or more coefficients with the output signal of the sensor to determine the first acceleration component due to the centrifugal force.

23. The at least one computer-accessible storage device of claim 22, wherein the processor is further directed to update the one or more coefficients during operation of the sensor and rotation of the object.

24. The at least one computer-accessible storage device of claim 22, wherein the processor is further directed to output a notification to a user interface based on the first acceleration component due to the centrifugal force.

* * * * *